(12) United States Patent
Ma

(10) Patent No.: US 11,766,926 B2
(45) Date of Patent: Sep. 26, 2023

(54) BATTERY PACK CASE, BATTERY PACK INCLUDING THE SAME AND VEHICLE INCLUDING BATTERY PACK

(71) Applicant: CALB Co., Ltd., Jiangsu (CN)

(72) Inventor: Tiebo Ma, Luoyang (CN)

(73) Assignee: CALB Co., Ltd., Jiangsu (CN)

( * ) Notice: Subject to any disclaimer, the term of this patent is extended or adjusted under 35 U.S.C. 154(b) by 187 days.

(21) Appl. No.: 17/375,011

(22) Filed: Jul. 14, 2021

(65) Prior Publication Data
US 2022/0363116 A1 Nov. 17, 2022

(30) Foreign Application Priority Data
May 11, 2021 (CN) .......................... 202110511775.5

(51) Int. Cl.
| | |
|---|---|
| *B60K 1/04* | (2019.01) |
| *B60L 50/64* | (2019.01) |
| *H01M 50/262* | (2021.01) |
| *H01M 50/204* | (2021.01) |
| *H01M 50/233* | (2021.01) |

(52) U.S. Cl.
CPC ................ *B60K 1/04* (2013.01); *B60L 50/64* (2019.02); *H01M 50/204* (2021.01); *H01M 50/233* (2021.01); *H01M 50/262* (2021.01); *H01M 2220/20* (2013.01)

(58) Field of Classification Search
CPC ............. H01M 20/204; H01M 50/233; H01M 50/262; H01M 2220/20; H01M 50/24; H01M 50/204; B60K 1/04
See application file for complete search history.

(56) References Cited

U.S. PATENT DOCUMENTS

| | | | |
|---|---|---|---|
| 11,038,236 B2 * | 6/2021 | Montgomery ...... | H01M 50/244 |
| 2018/0201110 A1 * | 7/2018 | Yin .......................... | B60L 50/66 |

FOREIGN PATENT DOCUMENTS

| | | |
|---|---|---|
| CN | 206076324 | 4/2017 |
| CN | 206379395 | 8/2017 |
| CN | 207938676 | 10/2018 |
| CN | 110544755 | 12/2019 |
| CN | 110611064 | 12/2019 |
| CN | 210349941 | 4/2020 |
| CN | 112018286 | 12/2020 |

(Continued)

OTHER PUBLICATIONS

Office Action of China Counterpart Application, with English translation thereof, dated Oct. 19, 2022, pp. 1-14.

(Continued)

*Primary Examiner* — James A English
*Assistant Examiner* — James J Triggs
(74) *Attorney, Agent, or Firm* — JCIP GLOBAL INC.

(57) ABSTRACT

A battery pack case and a vehicle having the battery pack case are provided. The battery pack case includes a beam disposed in the battery pack case and a connection column connected to the beam. A first chamber extending in a length direction of the beam is disposed inside the beam, and the first chamber penetrates through the beam. The connection column penetrates through a side wall of the first chamber. In an extending direction of the first chamber, two sides of the first chamber located at the connection column are provided with blocking portions.

19 Claims, 7 Drawing Sheets

(56) References Cited

FOREIGN PATENT DOCUMENTS

| | | |
|---|---|---|
| CN | 212571172 | 2/2021 |
| CN | 212796511 | 3/2021 |
| CN | 112751131 | 5/2021 |

OTHER PUBLICATIONS

"Search Report of Europe Counterpart Application", dated Jan. 12, 2022, pp. 1-6.
"Search Report of Europe Counterpart Application", dated Mar. 20, 2022, pp. 1-4.
Office Action of China Counterpart Application, with English translation thereof, dated Apr. 28, 2023, pp. 1-16.

* cited by examiner

BATTERY PACK CASE, BATTERY PACK INCLUDING THE SAME AND VEHICLE INCLUDING BATTERY PACK

CROSS-REFERENCE TO RELATED APPLICATION

This application claims the priority of China patent application serial no. 202110511775.5, filed on May 11, 2021. The entirety of the above-mentioned patent application is hereby incorporated by reference herein and made a part of this specification.

BACKGROUND

Technical Field

The disclosure relates to a technical field of battery electric vehicles, and specifically relates to a battery pack case, a battery pack including the same, and a vehicle including the battery pack.

Description of Related Art

The point suspension structure in a battery pack case refers to a structure configured to be fixed to the entire vehicle, and most of the battery pack cases are provided with the point suspension structure penetrating through the cases. In the driving proves, the vehicle generates vibration, which causes impact on the battery pack. Since the suspended point is the concentration point of the impact, the welded seams in the suspension point structure of the battery pack case may be easily cracked, airtightness of the battery pack case is thereby reduced, and an external liquid may thus enter the battery pack case.

SUMMARY

In view of the detects of the related art, the disclosure provides a battery pack case, a battery pack including the battery pack case, and a vehicle including the battery pack.

According to an aspect of the disclosure, a battery pack case is included. The battery pack case includes a beam disposed in the battery pack case and a connection column connected to the beam. A first chamber extending in a length direction of the beam is disposed inside the beam, and the first chamber penetrates through the beam. The connection column penetrates through a side wall of the first chamber. In an extending direction of the first chamber, two sides of the first chamber are respectively provided with blocking portions.

According to another aspect of the disclosure, a battery pack including the battery pack case is further provided.

According to still another aspect of the disclosure, a vehicle including the battery pack is further provided.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

Figure 1:
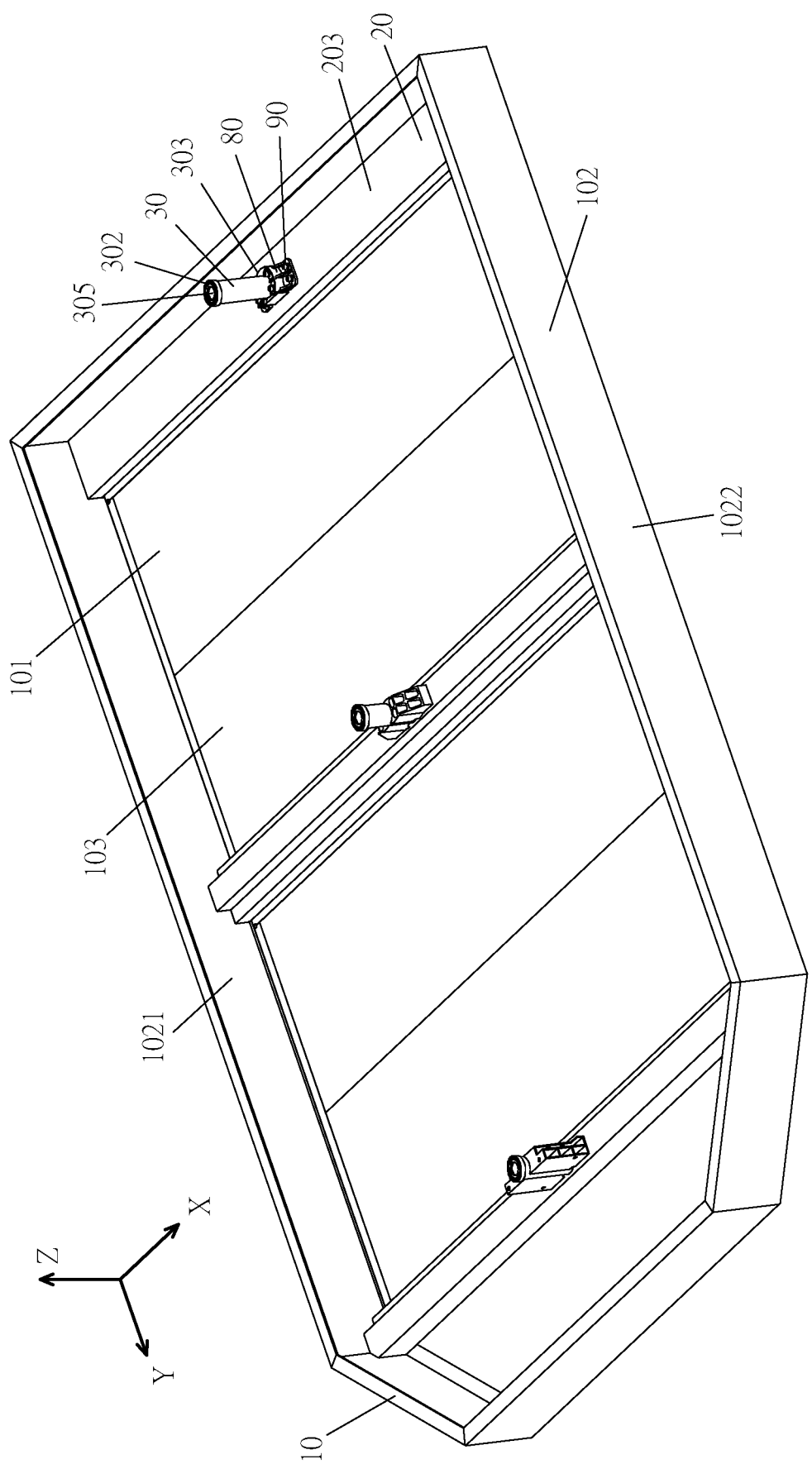
FIG. 1 is a schematic view illustrating a structure of a battery pack case according to an embodiment of the disclosure.
Figure 2:
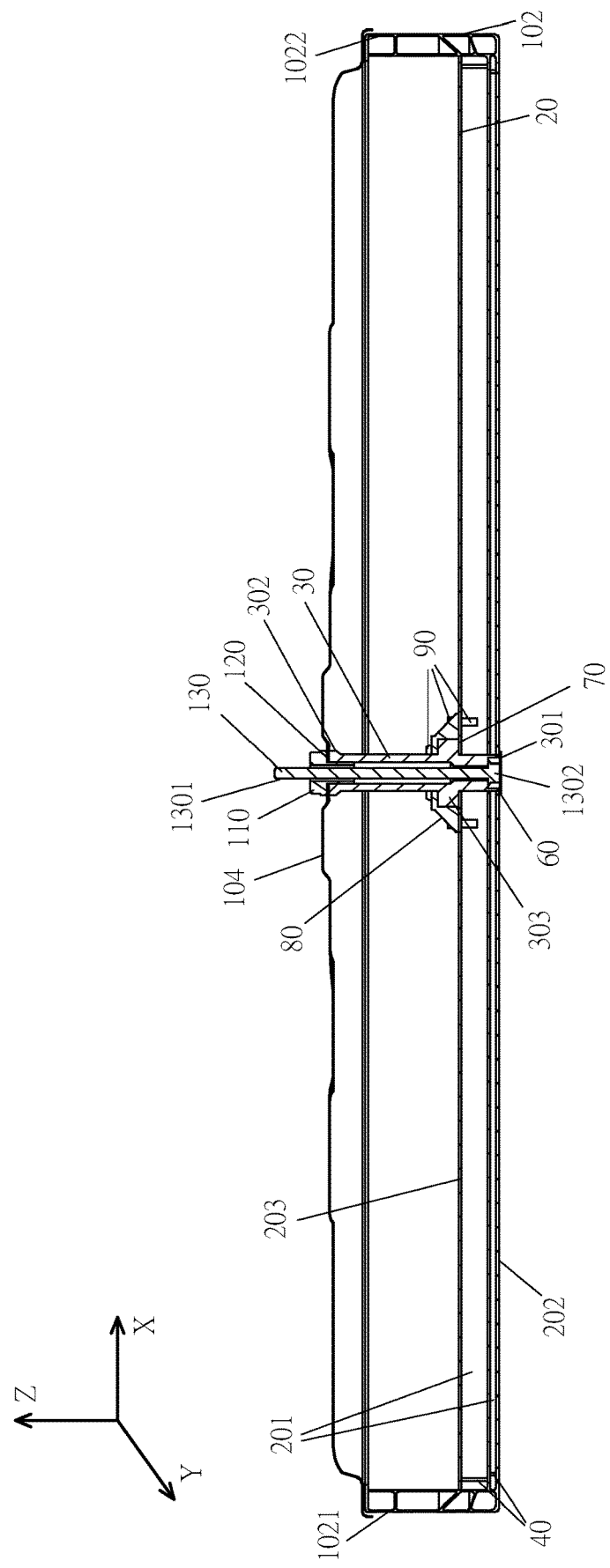
FIG. 2 is a schematic vertical cross-section view illustrating a battery pack case according to another embodiment of the disclosure.
Figure 3:
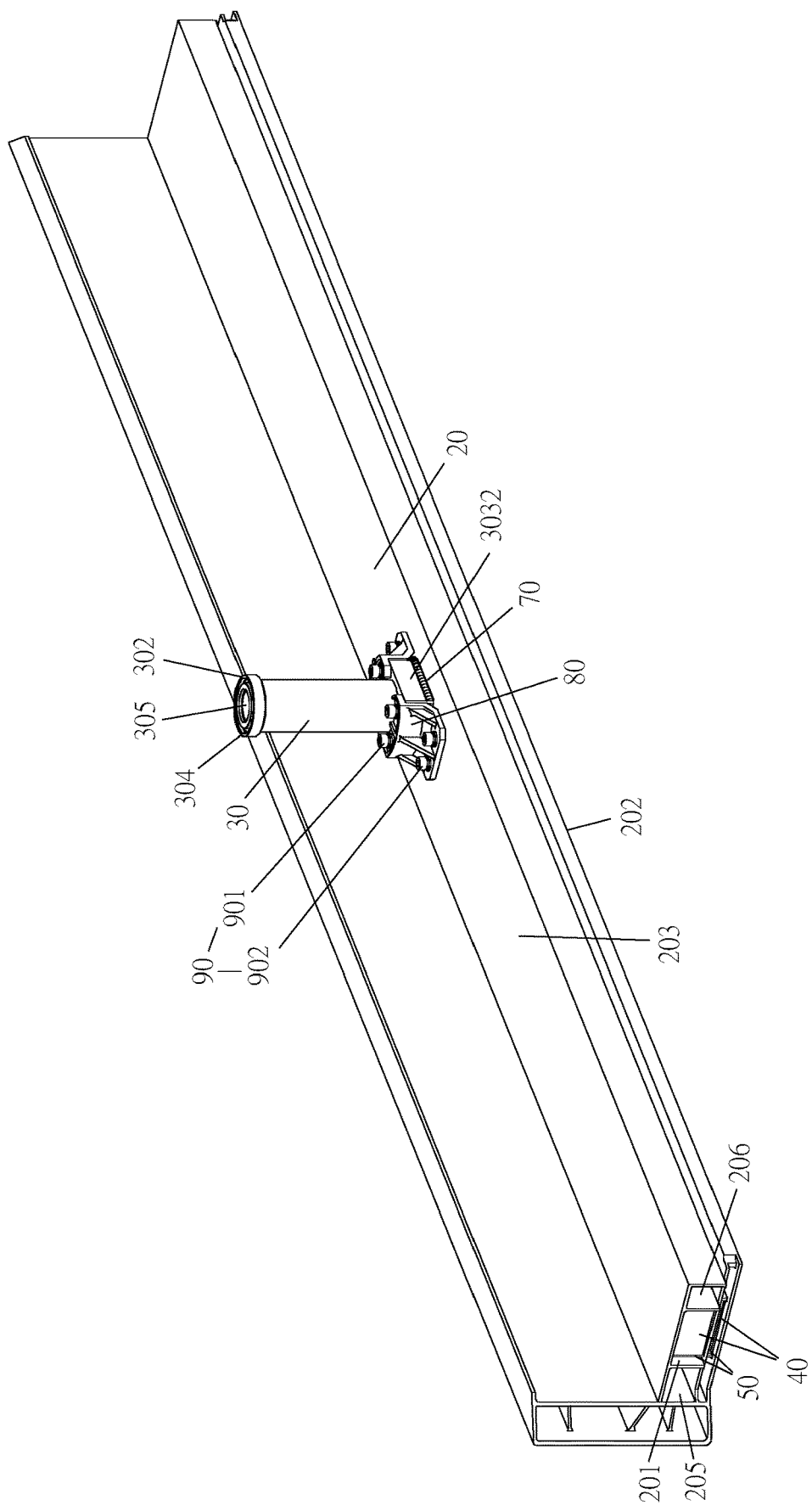
FIG. 3 is a schematic view illustrating a structure of connection of a connection column and a beam according to an embodiment of the disclosure.

As shown in FIG. 1 to FIG. 3, in the embodiments of the disclosure, a battery pack case 10 is provided. The battery pack case 10 includes a beam 20 disposed inside the battery pack case 10 (the beam 20 may also be disposed in a horizontal direction of the battery pack case 10 or disposed in a vertical direction of the battery pack case 10) and a connection column 30 connected to the beam 20. A first chamber 201 is disposed inside the beam 20 and extends in a length direction (i.e., an X direction and a Y direction of a horizontal plane of the battery pack case 10) of the beam 20, and the first chamber 201 penetrates through the beam 20. The connection column 30 penetrates through a side wall of the first chamber 201. In an extending direction of the first chamber 201, two sides of the first chamber 201 located at the connection column 30 are respectively provided with blocking portions 40. The battery pack case 10 includes a bottom plate 101 and a frame 102 disposed on the bottom plate 101. The bottom plate 101 and the frame 102 forms a second chamber 103, and the second chamber 103 is configured to accommodate a battery. In this embodiment, a Z axis is defined as a thickness direction of the battery pack case 10. One side of the battery pack case 10 close to a plane formed by an X axis and a Y axis is a bottom portion of the battery pack case 10, and one side of the battery pack case 10 away from the plane formed by the X axis and the Y axis is a top portion of the battery pack case 10. Since the blocking portions 40 may prevent an external liquid from entering an inner portion (i.e., the second chamber 103) of the battery pack case 10 through the first chamber 201, airtightness of the battery pack case 10 is improved. Further, since the first chamber 201 is disposed inside the beam 20, a weight of the beam 20 is reduced, and a weight of the battery pack case 10 is also reduced. The battery pack case 10 acts as a core component of a battery electric vehicle. Since mass of the battery pack case 10 accounts for about one-third of a complete vehicle kerb mass, development of lightweight design of a structure of the battery pack case 10 is of great significance for improving a target range of the battery electric vehicle.

In a specific embodiment, as shown in FIG. 1 and FIG. 2, the connection column 30 penetrates through the bottom plate 101 of the battery pack case 10, so the battery pack case 10 may exhibit favorable firmness and stability. The connection column 30 is configured to connect the battery pack and the vehicle, such that the battery pack is secured in the vehicle through the connection column 30.

In a specific embodiment, an avoidance groove matched with a first end 301 of the connection column 30 is disposed on the bottom plate 101 to avoid the connection column 30, and in this way, the battery pack case 10 may exhibit favorable firmness and stability.

In a specific embodiment, as shown in FIG. 1 and FIG. 2, the first end 301 of the connection column 30 penetrates through the beam 20 in a direction (i.e., the Z axis direction of the battery pack case 10) perpendicular to the length direction of the beam 20, and in this way, the battery pack case 10 may exhibit improved firmness and stability.

In a specific embodiment, as shown in FIG. 2, a second end 302 of the connection column 30 is connected to a wall body 104 of one side on the battery pack case 10 away from the beam 20, and in this way, the battery pack case 10 may exhibit improved firmness and stability, and a favorable sealing property is also provided.

In a specific embodiment, as shown in FIG. 1 and FIG. 2, a bottom portion of the beam 20 is attached to the bottom plate 101, so that firmness, stability and the sealing property of the battery pack case 10 may be further improved. As an example, a bottom surface of the beam 20 is attached to a top surface of the bottom plate 101. As another example, a side surface of a bottom portion 202 of the beam 20 is attached to a side surface of the bottom plate 101.

In a specific embodiment, the beam 20 is welded to the bottom plate 101.

In a specific embodiment, as shown in FIG. 1 and FIG. 2, the beam 20 and the bottom plate 101 are an integral structure, which is simple and may be easily formed.

In a specific embodiment, the blocking portions 40 are respectively disposed on two ends of the beam 20, and the blocking portions 40 are connected to the frame 102 of the battery pack case 10. Through arrangement of the blocking portions 40, the external liquid is prevented from entering the inner portion of the battery pack case 10 through the first chamber 201, and the beam 20 and the frame 102 of the battery pack case 10 may be easily and effectively connected, so that a sealing effect of the battery pack case 10 is further improved. As an example, two blocking portions 40 are provided, and the two blocking portions 40 are respectively disposed on two ends of the beam 20. As shown in FIG. 1 and FIG. 2, the frame 102 of the battery pack case 10 includes a first side wall 1021 and a second side wall 1022 opposite to each other. The two ends of the beam 20 are respectively connected to the first side wall 1021 and the second side wall 1022. Herein, the blocking portions 40 are provided as block bodies.

In a specific embodiment, a distance between the blocking portion 40 close to a first end of the beam 20 and the first end of the beam 20 is greater than or equal to 5 millimeters and less than or equal to 25 millimeters. A distance between the blocking portion 40 close to a second end of the beam 20 and the second end of the beam 20 is greater than or equal to 5 millimeters and less than or equal to 25 millimeters. In this way, the blocking portions 40 may be conveniently disposed in the first chamber 201 without affecting the connection between the frame 102 of the battery pack case 10 and the beam 20. As an example, the frame 102 of the battery pack case 10 is welded to the beam 20. As an example, there is one blocking portion 40 close to the first end of the beam 20, and there is one blocking portion 40 close to the second end of the beam 20. According to actual needs, the distance between the blocking portion 40 close to the first end of the beam 20 and the first end of the beam 20 and the distance between the blocking portion 40 close to the second end of the beam 20 and the second end of the beam 20 may be adjusted, and such distances are not limited to 5 millimeters to 25 millimeters. Herein, the blocking portions 40 are provided as plate bodies. As structures of the blocking portions 40 are simple, the blocking portions 40 may be conveniently manufactured and shaped, and the plate-shaped blocking portions 40 may be conveniently disposed in the first chamber 201 without affecting the welding between the beam 20 and the frame 102 of the battery pack case 10.

Figure 4:
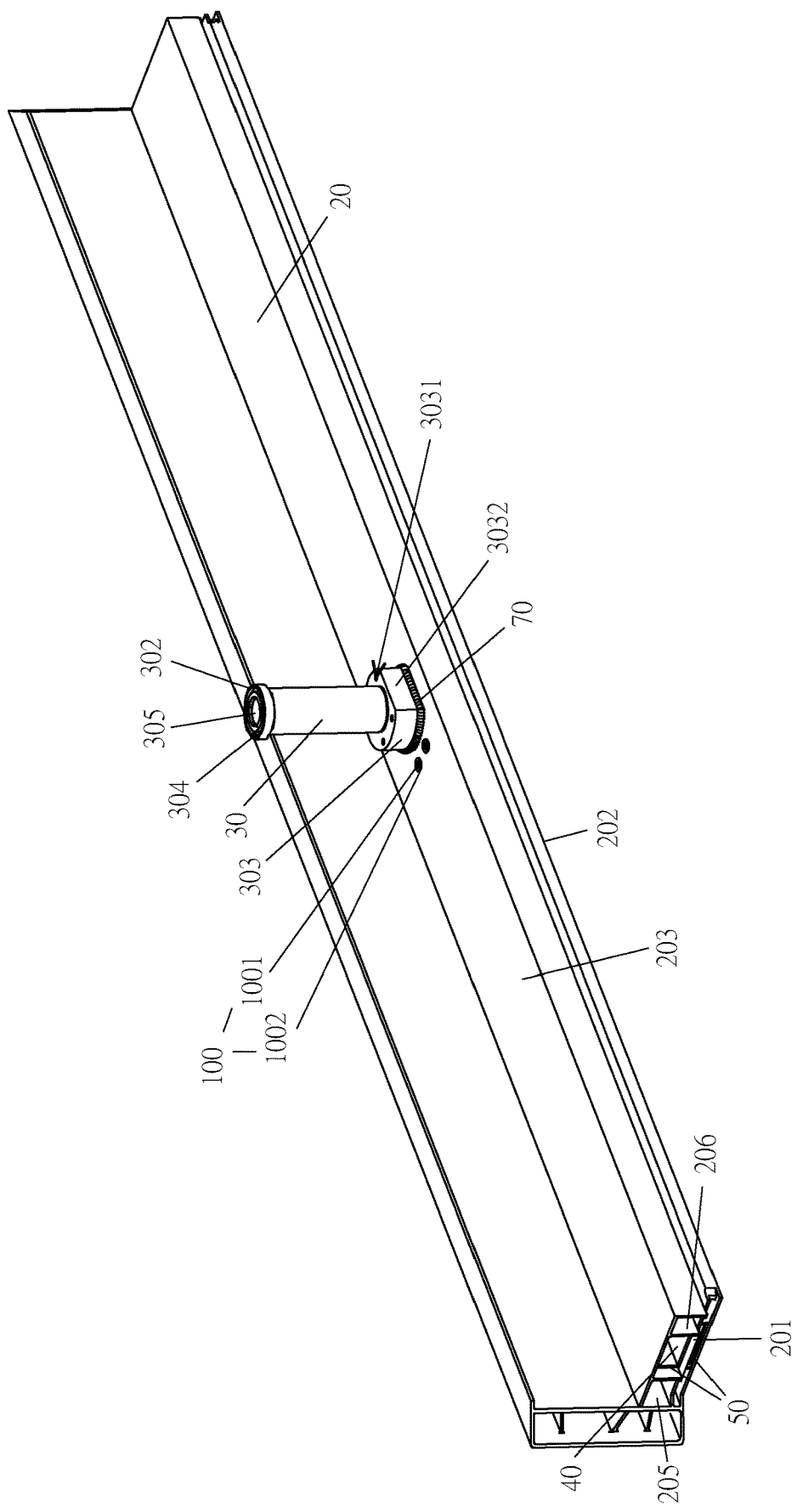
FIG. 4 is a schematic view illustrating a structure of arrangement of the connection column on the beam according to an embodiment of the disclosure.
Figure 5:
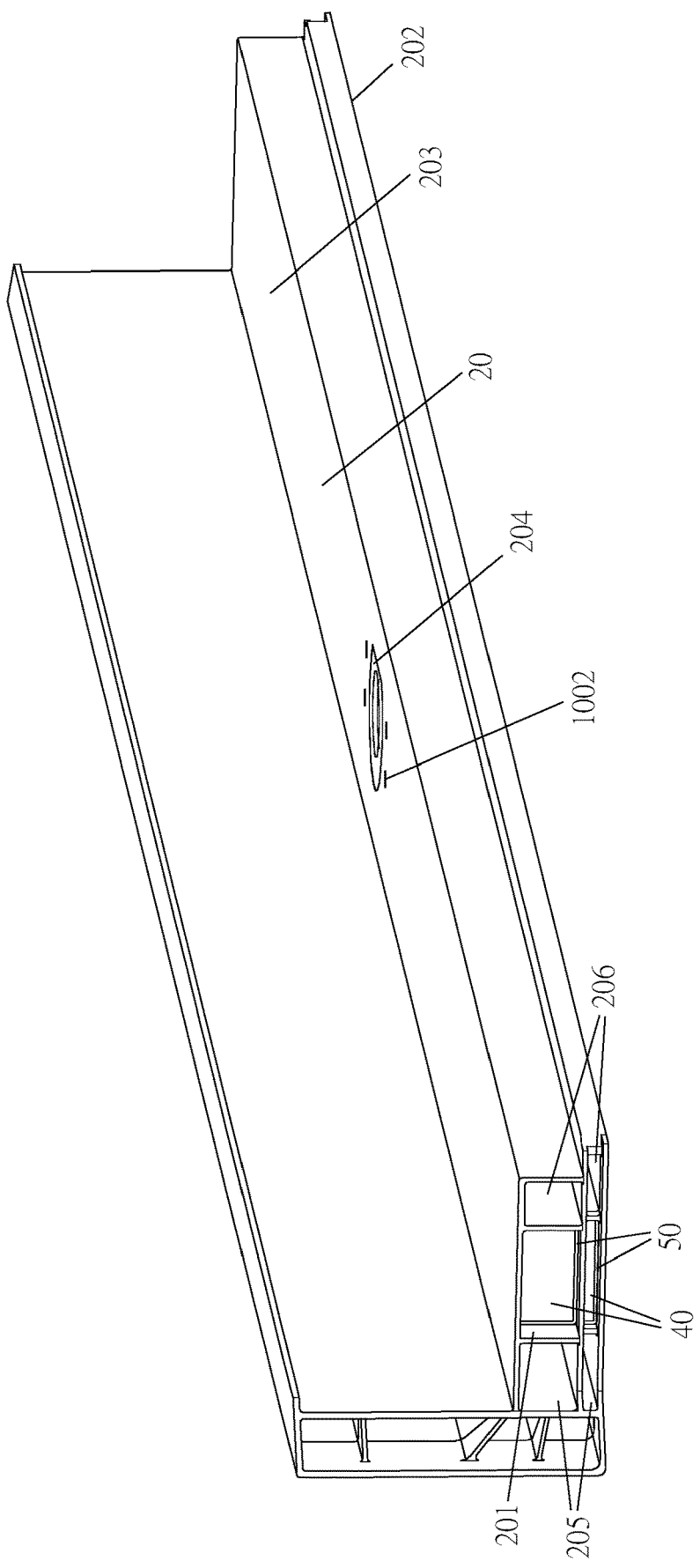
FIG. 5 is a schematic view illustrating a structure of the beam according to an embodiment of the disclosure.

In a specific embodiment, as shown in FIG. 3 to FIG. 5, a peripheral edge of each of the blocking portions 40 and an inner wall of the beam 20 are welded through a welded seam portion 50. In this way, firmness and stability of the blocking portions 40 are improved, and the sealing effect of the battery pack case 10 is also enhanced.

In a specific embodiment, as shown in FIG. 2, a first sealing portion 60 is disposed at a joint between the bottom portion 202 of the beam 20 and the connection column 30. In this way, firmness and stability of the connection column 30 are improved, and the sealing effect of the battery pack case 10 is also enhanced. As shown in FIG. 2 to FIG. 4, a second sealing portion 70 is disposed at a joint between the top portion 203 of the beam 20 and the connection column 30. In this way, firmness and stability of the connection column 30 are further improved, and the sealing effect of the battery pack case 10 is also enhanced. The top portion 203 of the beam 20 and the bottom portion 202 of the beam 20 are opposite to each other. As an example, the bottom portion 202 of the beam 20 acts as an outer side of the beam 20. The top portion 203 of the beam 20 acts as an inner side of the beam 20.

In a specific embodiment, as shown in FIG. 2, the first sealing portion 60 includes a first circumferential welded seam disposed on an outer surface of the joint between the bottom portion 202 of the beam 20 and the connection column 30, so that favorable welding strength and improved sealing effect are provided. As shown in FIG. 2 to FIG. 4, the second sealing portion 70 includes a second circumferential welded seam disposed on an outer surface of the joint between the top portion 203 of the beam 20 and the connection column 30, so that favorable welding strength and improved sealing effect are provided.

In a specific embodiment, as shown in FIG. 1 to FIG. 3, FIG. 7, and FIG. 8, a reinforcing member is further included. The reinforcing member 80 is connected to the beam 20 and the connection column 30 through a first fastener 90, and through arrangement of the reinforcing member 80, the connection column 30 may be conveniently fixed, space saving is achieved, strength and rigidity of the connection column 30 are improved, and safety of use of the battery pack case 10 is enhanced.

In a specific embodiment, as shown in FIG. 3 and FIG. 4, the first fastener 90 includes first bolts 901 and second bolts 902. A first reinforcing portion 801 of the reinforcing member 80 is connected to the connection column 30 through the first bolts 901. A second reinforcing portion 802 of the reinforcing member 80 is connected to the beam 20 through the second bolts 902. A side wall of the top portion 203 of the beam 20 is provided with a blind hole portion 100 configured for fixing the second bolt 902, and in this way, the sealing effect of the battery pack case 10 is further improved. As an example, when the reinforcing member 80 is connected to the beam 20 and the connection column 30, the first reinforcing portion 801 of the reinforcing member 80 is a top side of the reinforcing member 80. The second reinforcing portion 802 of the reinforcing member 80 is a bottom side of the reinforcing member 80.

Figure 7:
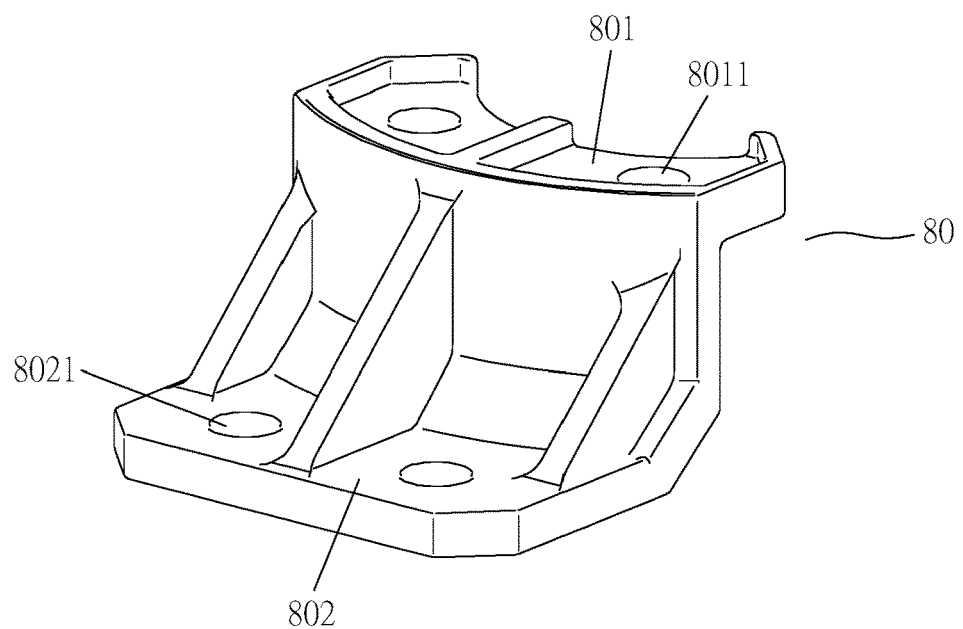
FIG. 7 is a schematic view illustrating a structure of a reinforcing member viewed from an angle according to an embodiment of the disclosure.
Figure 8:
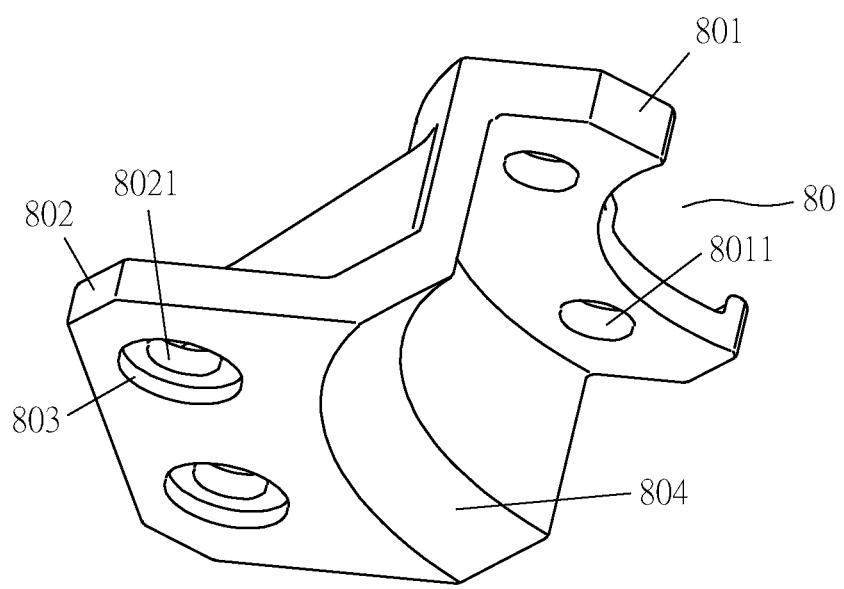
FIG. 8 is a schematic view illustrating the structure of the reinforcing member viewed from another angle according to an embodiment of the disclosure.

In a specific embodiment, as shown in FIG. 4, the blind hole portion 100 is formed through riveting by a first sealing blind rivet nut 1001. Herein, the first sealing blind rivet nut 1001 includes a head portion and a penetration and installation portion connected to the head portion. A bottom portion of the penetration and installation portion is closed, and an inner portion of the penetration and installation portion is provided with a thread matched with the second bolt 902. As shown in FIG. 5, the first sealing blind rivet nut 1001 is non-circular, which has anti-rotation property. The side wall of the top portion 203 of the beam 20 is provided with a first polygonal hole 1002, and the penetration and installation portion is disposed in the first polygonal hole 1002, such that the first sealing blind rivet nut 1001 is prevented from rotating on the side wall of the top portion 203 of the beam 20. After riveting is completed, a sealing layer is formed between the side wall of the top portion 203 of the beam 20 and the first sealing blind rivet nut 1001, and requirements for sealing are thereby satisfied. Moreover, the first sealing blind rivet nut 1001 may be securely meshed with the side wall of the top portion 203 of the beam 20 to prevent rotation and facilitate firmness and reliability The second bolt 902 penetrates through a connection hole 8021 (as shown in FIG. 7 and FIG. 8) of the second reinforcing portion 802 of the reinforcing member 80 to be connected to the first sealing blind rivet nut 1001, and in this way, the second reinforcing portion 802 of the reinforcing member 80 and the beam 20 are well connected and sealed.

In a specific embodiment, the blind hole portion 100 is formed through riveting by a second sealing blind rivet nut and the second bolt 902. A through hole penetrating through two ends is disposed inside the second sealing blind rivet nut. The side wall of the top portion 203 of the beam 20 is provided with a second polygonal hole, and the second sealing blind rivet nut is placed in the second polygonal hole. A suitable tool may be adopted to secure the second bolt 902 penetrating through the connection hole 8021 (as shown in FIG. 7 and FIG. 8) of the second reinforcing portion 802 of the reinforcing member 80 and the second sealing blind rivet nut. Along with a pulling force generated by the second bolt 902, a sleeve of the second sealing blind rivet nut is squeezed and deformed, and a bulging portion is pressed against an inner surface of the side wall of the top portion 203 of the beam 20. In this way, the second sealing blind rivet nut is fixed onto the side wall of the top portion 203 of the beam 20, and the second reinforcing portion 802 of the reinforcing member 80 and the beam 20 are thereby well connected and sealed.

In a specific embodiment, the blind hole portion 100 is formed through riveting by a third sealing blind rivet nut. A through hole penetrating through two ends is disposed inside the third sealing blind rivet nut. The side wall of the top portion 203 of the beam 20 is provided with a third polygonal hole. A suitable tool may be adopted to allow the third sealing blind rivet nut to be placed in the third polygonal hole and fixed onto the side wall of the top portion 203 of the beam 20. The second bolt 902 penetrates through the connection hole 8021 (as shown in FIG. 7 and FIG. 8) of the second reinforcing portion 802 of the reinforcing member 80 to be connected to the third sealing blind rivet nut, and in this way, the second reinforcing portion 802 of the reinforcing member 80 and the beam 20 are well connected and sealed.

In a specific embodiment, as shown in FIG. 1 to FIG. 4 and FIG. 6 to FIG. 8, the connection column 30 is provided with a protruding portion 303. The protruding portion 303 is located on the joint between the connection column 30 and the top portion 203 of the beam 20 to facilitate connection between the reinforcing member 80 and the connection column 30. The first reinforcing portion 801 of the reinforcing member 80 is connected to the protruding portion 303 through the first bolts 901, and the reinforcing member 80 may be conveniently fixed through the protruding portion 303. Screw holes 3031 matched and used together with the first bolts 901 are disposed on the protruding portion 303. Each of the first bolts 901 penetrates through the connection hole 8011 of the first reinforcing portion 801 of the reinforcing member 80 to be matched and used together with the screw hole 3031, and in this way, the reinforcing member 80 and the connection column 30 may be easily and effectively fixed, and a simple structure which may be conveniently used is provided.

In a specific embodiment, as shown in FIG. 1, FIG. 2, FIG. 4, and FIG. 6, the protruding portion 303 is disposed in a circumferential direction of the connection column 30, and in this way, strength of the connection column 30 is improved, and a favorable appearance is also provided. The protruding portion 303 may also be disposed only on one side of the connection column 30 close to the reinforcing member 80, such that the reinforcing member 80 may be conveniently connected. Here, a shape of the protruding portion 303 may not be limited.

In a specific embodiment, as shown in FIG. 5, the side wall of the top portion 203 of the beam 20 is provided with a groove portion 204 matched with the protruding portion 303 and configured for preventing the protruding portion 303 from rotating, such that the protruding portion 303 may be conveniently fixed. The connection column 30 may thus be positioned, and the reinforcing member 80 may thus be conveniently fixed through the first bolts 901. Here, a cross section of the protruding portion 303 is non-circular, and correspondingly, a cross section of the groove portion 204 is non-circular. When the protruding portion 303 is located in the groove portion 204, the connection column 30 cannot rotate. The connection column 30 may thus be positioned, and the reinforcing member 80 may be conveniently fixed through the first bolts 901.

Figure 6:
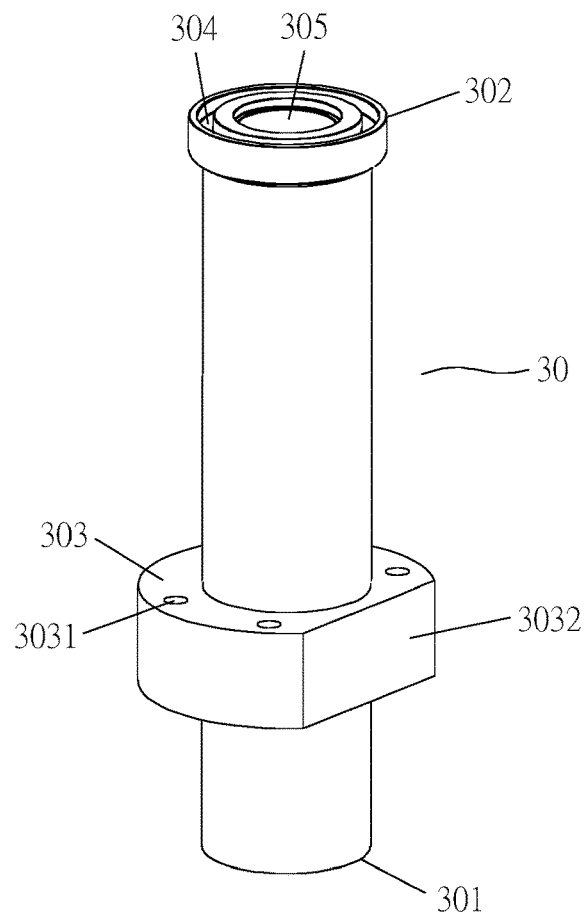
FIG. 6 is a schematic view illustrating a structure of the connection column according to an embodiment of the disclosure.

In a specific embodiment, as shown in FIG. 4 and FIG. 6, the protruding portion 303 is a flange. The flange is provided with a notch 3032, such that the flange may be conveniently connected and may withstand a great pressure. The flange is provided with the notch 3032, and correspondingly, the cross section of the groove portion 204 is non-circular, such that the groove portion 204 may be matched with the notch 3032 of the flange. In this way, when the flange is located in the groove portion 204, the connection column 30 cannot rotate, and the connection column 30 may thus be conveniently positioned.

In a specific embodiment, as shown in FIG. 8, an inner surface of the second reinforcing portion 802 of the reinforcing member 80 is provided with a first avoidance portion 803 configured for the first sealing blind rivet nut 1001, the second sealing blind rivet nut, and/or the third sealing blind rivet nut to be avoided to facilitate connection between the reinforcing member 80 and the beam 20, and firmness is also improved.

In a specific embodiment, as shown in FIG. 8, the inner surface of the second reinforcing portion 802 of the reinforcing member 80 is further provided with a second avoidance portion 804 configured for the second sealing portion 70 to be avoided to facilitate connection between the reinforcing member 80 and the connection column 30, and firmness is also improved.

In a specific embodiment, a number of the reinforcing member 80 is one or greater than one. A number of the first bolt 901 corresponding to each reinforcing member 80 is one or greater than one. A number of the second bolt 902 corresponding to each reinforcing member 80 is one or greater than one, and a number of the blind hole portion 100 is correspondingly be one or greater than one. Herein, the number of greater than one is at least two.

In a specific embodiment, as shown in FIG. 1 to FIG. 3, the number of the reinforcing member 80 is two. As an example, the two reinforcing members 80 are symmetrically disposed on two sides of the connection column 30, so that a force is evenly received, and a good reinforcement effect is provided. The number of the first bolt 901 corresponding to each reinforcing member 80 is two. The number of the second bolt 902 corresponding to each reinforcing member 80 is two, and the number of the blind hole portion 100 is correspondingly be two.

In a specific embodiment, the reinforcing member 80 is formed by die casting of aluminum and mold processing and thereby exhibits a simple structure and may be conveniently used.

In a specific embodiment, as shown in FIG. 2, the second end 302 of the connection column 30 and the wall body 104 are connected through the second fastener 110, and a portion of the second fastener 110 is inserted in the second end 302 of the connection column 30.

In a specific embodiment, as shown in FIG. 2, the second fastener 110 is a third bolt, and a shank of the third bolt is inserted in the second end 302 of the connection column 30.

In a specific embodiment, as shown in FIG. 3, FIG. 4, and FIG. 6, the second end 302 of the connection column 30 is provided with a groove body 304. A sealing ring 120 (as shown in FIG. 2) configured for increasing airtightness between the connection column 30 and the wall body 104 is disposed inside the groove body 304, and a flange of the third bolt corresponds to the sealing ring 120, such that the sealing effect of the battery pack case 10 may be further improved. Herein, the groove body 304 may be disposed on one side of the wall body 104 facing the beam 20, and the sealing ring 120 is disposed in the groove body 304 and corresponds to the flange of the third bolt. The groove body 304 may also be disposed on one side of the wall body 104 facing a vehicle body, and the sealing ring 120 is disposed in the groove body 304 and corresponds to the flange of the third bolt.

In a specific embodiment, as shown in FIG. 1, FIG. 3, FIG. 4, and FIG. 6, a third chamber 305 penetrating through the first end 301 and the second end of the connection column 30 is disposed inside the connection column 30. As an example, a cross section of the connection column 30 shaped as a circular ring. The shank of the third bolt is inserted in the third chamber 305 corresponding to the second end 302 of the connection column 30.

In a specific embodiment, as shown in FIG. 2, an inverted T-shaped connector 130 is also included. A first end of the inverted T-shaped connector 130 penetrates through the third chamber 305 of the connection column 30, the wall body 104 and the third bolt, and is configured to connect the vehicle body and the battery pack case 10. A second end 1302 of the inverted T-shaped connector 130 is engaged with the first end 301 of the connection column 30, such that favorable firmness is achieved and a good sealing effect is provided.

In a specific embodiment, as shown in FIG. 2, the inverted T-shaped connector 130 is a long bolt.

In a specific embodiment, as shown in FIG. 1 and FIG. 2, when the beam 20 is connected to the battery pack case 10, the beam 20 is disposed on the bottom portion of the battery pack case 10.

In a specific embodiment, as shown in FIG. 1, the beam 20 and the connection column 30 are both disposed on a tail portion of the battery pack case 10, and in this way, space saving is achieved, and strength and rigidity of the battery pack case 10 may be effectively improved.

In a specific embodiment, the beam 20 is formed by extrusion of an aluminum profile, such that the battery pack case 10 may have a less weight and may be easily formed.

In a specific embodiment, as shown in FIG. 3 to FIG. 5, in the beam 20, a fourth chamber 205 and a fifth chamber 206 extending in the length direction of the beam 10 are respectively disposed on two sides of the first chamber 201. Herein, the fourth chamber 205 is disposed on one side away from a module and is configured for placement of a low-voltage wiring. An assembly space of the low-voltage wiring may thus be simplified, and the battery pack case 10 may be organized in an orderly manner. The fifth chamber 206 is disposed on one side close to the module and is configured for placement of the module and fixing of the blind rivet nut, such that the battery pack case 10 may be further organized in an orderly manner.

In a specific embodiment, the external liquid includes water.

When the disclosure is applied, it is ensured that when the entire vehicle is in a vibration and impact condition, if the first sealing portion 60 (as shown in FIG. 2) located on the bottom portion 202 of the beam 20 is cracked and failed, under the joint protection provided by the connection column 30, the blocking portions 40, the second sealing portion 70 and the blind hole portion 100, the external liquid is prevented from entering the battery pack case 10 through the joint between the top portion 203 of the beam 20 and the connection column 30 and the joint between the end portion of the beam 20 and the frame 102 of the battery pack case 10. As such, the battery pack case 10 is ensured to provide double airtightness. The battery pack case provided by the disclosure exhibits a high level of strength and ingress protection (IP), enhanced safety of use, good reliability, and a favorable sealing property.

Based on the battery pack case provided by the foregoing embodiments, the disclosure further provides a battery pack including the battery pack case, which has a favorable sealing property, a high level of strength and IP, enhanced safety of use and good reliability.

Based on the battery pack case provided by the foregoing embodiments, the disclosure further provides a vehicle including the battery pack case, and the vehicle is capable of improving power supply performance, safety performance and stability performance of the vehicle.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery pack case, comprising:
a beam, disposed in the battery pack case; and
a connection column, connected to the beam;
wherein a first chamber extending in a length direction of the beam is disposed inside the beam,
the connection column penetrates through a side wall of the first chamber, and in an extending direction of the first chamber, two sides of the first chamber are respectively provided with blocking portions,
the battery pack case further comprises a reinforcing member, wherein the reinforcing member is connected to the beam and the connection column through a first fastener.

2. The battery pack case according to claim 1, wherein the connection column penetrates through a bottom plate of the battery pack case.

3. The battery pack case according to claim 2, wherein a bottom portion of the beam is attached to the bottom plate.

4. The battery pack case according to claim 1, wherein the blocking portions are respectively disposed on two ends of the beam, and the blocking portions are connected to a frame of the battery pack case.

5. The battery pack case according to claim 1, wherein a distance between one of the blocking portions closer to a first end of the beam and the first end of the beam is greater than or equal to 5 millimeters, and a distance between another one of the blocking portions closer to a second end of the beam and the second end of the beam is greater than or equal to 5 millimeters.

6. The battery pack case according to claim 1, wherein a distance between one of the blocking portions closer to a first end of the beam and the first end of the beam is less than or equal to 25 millimeters, and a distance between another one of the blocking portions closer to a second end of the beam and the second end of the beam is less than or equal to 25 millimeters.

7. The battery pack case according to claim 1, wherein peripheral edges of the blocking portions are welded to an inner wall of the beam.

8. The battery pack case according to claim 1, wherein the blocking portions comprise plate bodies and block bodies, or the blocking portions comprise plate bodies or block bodies.

9. The battery pack case according to claim 1, wherein a first sealing portion is disposed at a joint between a bottom portion of the beam and the connection column, a second sealing portion is disposed at a joint between a top portion of the beam and the connection column, and the top portion of the beam and the bottom portion of the beam are opposite to each other.

10. The battery pack case according to claim 9, wherein the first sealing portion comprises a first circumferential welded seam, and the second sealing portion comprises a second circumferential welded seam.

11. The battery pack case according to claim 1, wherein the first fastener comprises a first bolt and a second bolt, a first reinforcing portion of the reinforcing member is connected to the connection column through the first bolt, a second reinforcing portion of the reinforcing member is connected to the beam through the second bolt, and a side wall of a top portion of the beam is provided with a blind hole portion configured for fixing the second bolt.

12. The battery pack case according to claim 11, wherein the blind hole portion is formed through riveting.

13. The battery pack case according to claim 1, wherein a second end of the connection column is connected to a wall body of one side of the battery pack case through a second fastener.

14. The battery pack case according to claim 13, wherein the second end of the connection column is provided with a accommodating part, and a sealing ring is disposed in the accommodating part.

15. The battery pack case according to claim 14, further comprising an inverted T-shaped connector, a first end of the inverted T-shaped connector penetrates through the connection column, the wall body, and the second fastener, and is configured to connect a vehicle body and the battery pack case.

16. A battery pack, comprising the battery pack case according to claim 1.

17. A battery pack, comprising the battery pack case according to claim 2.

18. A battery pack, comprising the battery pack case according to claim 5.

19. A vehicle, comprising the battery pack according to claim 16.

\* \* \* \* \*